(12) United States Patent
Lindroos et al.

(10) Patent No.: US 7,166,682 B2
(45) Date of Patent: Jan. 23, 2007

(54) PROCESS TO PREPARE A PARTICULATED METALLOCENE CATALYST WITH A MODIFIED ALUMINOXANE AND USE IN POLYMERIZATION OF OLEFINS

(75) Inventors: Jarmo Lindroos, Brevik (NO); Siw Bodil Fredriksen, Skien (NO); Pål Christian Bentzrød, Stavern (NO)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 10/526,209

(22) PCT Filed: Sep. 4, 2003

(86) PCT No.: PCT/EP03/09803

§ 371 (c)(1),
(2), (4) Date: Jun. 20, 2005

(87) PCT Pub. No.: WO2004/022571

PCT Pub. Date: Mar. 18, 2004

(65) Prior Publication Data

US 2005/0239637 A1  Oct. 27, 2005

(30) Foreign Application Priority Data

Sep. 5, 2002  (GB) .................... 0220681.1

(51) Int. Cl.
*C08F 4/42* (2006.01)
(52) U.S. Cl. ............ 526/160; 526/943; 526/348; 526/141; 526/142; 502/103; 502/152; 502/126; 502/123; 502/125
(58) Field of Classification Search ........... 526/160, 526/943, 348, 141, 142; 502/103, 152, 126, 502/123, 125
See application file for complete search history.

(56) References Cited

U.S. PATENT DOCUMENTS

| 5,892,079 A | 4/1999 | Wilson | 556/11 |
| 5,908,903 A * | 6/1999 | Rosch | 526/153 |
| 5,932,514 A * | 8/1999 | Ernst et al. | 502/439 |
| 6,025,407 A * | 2/2000 | Nagy et al. | 522/29 |
| 6,576,723 B1 | 6/2003 | Bohnen et al. | 526/13 |

FOREIGN PATENT DOCUMENTS

| DE | 19823172 A1 | 11/1999 |
| EP | 0360492 A2 | 3/1990 |
| EP | 0 630 910 | * 12/1994 |
| EP | 0630910 A1 | 12/1994 |
| EP | 0638595 A2 | 2/1995 |
| EP | 0685494 A1 | 12/1995 |
| EP | 0781783 A1 | 12/1996 |
| EP | 0774470 A1 | 5/1997 |
| EP | 0582268 B1 | 11/1998 |
| EP | 0787746 B1 | 8/1999 |
| EP | 0129368 B2 | 4/2002 |
| EP | 0206794 B2 | 8/2002 |
| JP | 04284501 | 5/1994 |
| WO | WO 93/13140 | * 7/1993 |
| WO | WO 97/02297 | * 1/1997 |
| WO | WO 98/20045 | * 5/1998 |

OTHER PUBLICATIONS

Fischer et al., Makromol. Chem., Macromol. Symp. 66, 191-202 (1993).*
Belelli, Patricia Gabriela et al., Macromolecular Chemistry and Physics (2000), 201(13), 1458-1465.
Patent Abstracts of Japan, vol. 016, No. 234 (C-0945), May 29, 1992 & JP04 049293 A(Idemitsu Kosan Co. Ltd.), Feb. 18, 1992 abstract.
Fischer, D. et al., Makromolekulare Chemie, Marcomolecular Symposia, Huthig und Wepf Verlag. Basel, CH, vol. 66, Feb. 1, 1993, pp. 191-202.
Ferreira, M.L. et al., Macromolecular Chemistry and Physics (2001), 202(6), 830-839.
Janiak et al, J. Pol. Sci., Part A, vol. 31, No. 12 (1993), 2959-2968.

* cited by examiner

*Primary Examiner*—Ling-Sui Choi
(74) *Attorney, Agent, or Firm*—Needle & Rosenberg, P.C.

(57) ABSTRACT

A process for the preparation of an olefin polymerisation catalyst comprising: a) reacting an aluminoxane and a Lewis base in an optionally halogenated hydrocarbon solvent to form a particulate suspension; b) reacting said suspension with a metallocene complex in an optionally halogenated hydrocarbon solvent; and optionally c) isolating the olefin polymerisation catalyst.

13 Claims, No Drawings

PROCESS TO PREPARE A PARTICULATED METALLOCENE CATALYST WITH A MODIFIED ALUMINOXANE AND USE IN POLYMERIZATION OF OLEFINS

CROSS REFERENCE TO RELATED APPLICATIONS

The present application claims priority to Great Britain Patent Application No. 0220681.1, filed Sep. 5, 2002 which application is incorporated herein fully by this reference.

This invention relates to a process for the preparation of an unsupported single site catalyst, to the use of the catalyst in olefin polymerisations and to the catalyst per se. In particular, the invention describes the use of an aluminoxane co-catalyst and Lewis base to form a particulate suspension which is subsequently reacted with a single site complex to form the catalyst species.

Many processes and catalysts are known for the preparation of homo and co-polymeric olefins. Ziegler-Natta catalyst compositions, developed in the 1950s, were found to be particularly useful in the preparation of polyolefins due to their high activity. As an alternative to Ziegler-Natta species Phillips developed catalyst systems based around chromium oxide compounds.

More recently, single-site catalysts, e.g. metallocenes, have been used to prepare polyolefins since they allow the preparation of polymers having narrow molecular weight distribution and compositional uniformity. Moreover, these features may be readily controlled using single site catalysts.

In the last few years, single-site catalysts have been supported on inorganic or polymeric supports and used in heterogeneous catalysis. Such supported catalyst species are known to perform better than their corresponding non-supported analogues since, inter alia, they give rise to polymer particles having better morphology. At present, supported single-site catalysts are routinely used in olefin polymerisation. Supports used may be polyolefinic or inorganic but it is conventional to use a silica or alumina support.

However, the preparation of supported catalysts is complicated and expensive. Before most supports can be impregnated with the actual single site species it is necessary to calcinate the support. In this process the support is exposed to temperatures of up to 800° C. so as to remove surface hydroxyl groups which could interfere with catalyst loading and subsequent polymerisation. Once calcination has occurred the single site catalyst needs to be impregnated into the support. This process often results in catalyst wastage and of course requires the support to be porous. Moreover, catalyst left on the surface of a support rather than in a pore can cause hotspots in a reactor during polymerisation. Finally, the supports used are also expensive as they need to be pure and porous and also are made of potentially expensive material. Nevertheless, the skilled polymer chemist still prefers to use supported catalysts despite the above limitations due to the improvements in polymer properties which result.

It would be desirable however, if polymerisation could take place in the absence of a supported catalyst but still give rise to polymer particles which have the excellent particle morphology normally realised with a supported species. Also, polymers made using unsupported catalysts will obviously be free from any residual carrier material. In certain applications, e.g. film applications this may be important since in polymers made using conventional supported catalysts, particles of the carrier may be visible in the film.

It is generally believed that it is very difficult to obtain good particle morphology using an unsupported catalyst, i.e. one where a conventional carrier such as silica or alumina is not employed. However, the present inventors have surprisingly found that good particle morphology in the eventual polymer can be obtained when the catalyst is made by forming particles from the reaction of an aluminoxane with a Lewis base in a hydrocarbon solvent. Subsequently, the resulting particles may be reacted with a single site complex to form a suspension of small catalyst particles which may be used as an olefin polymerisation catalyst.

Whilst aluminoxane is a very common co-catalyst for olefin polymerisation and Lewis bases have been routinely used in polymerisations, never before has it been suggested that they may be used to form a suspension which may act, in combination with the single site complex, as a catalyst.

For example, in EP-A-630910 the use of a Lewis base in an olefin polymerisation is described however, the Lewis base is present to control the activity of the reaction rather than to form particles.

In WO 98/20045 certain Lewis bases are described as antifouling agents. In U.S. Pat. No. 5,892,079 neutral Lewis bases are suggested as additives to accelerate the rate of polymerisation.

Thus, viewed from one aspect the invention provides a process for the preparation of an olefin polymerisation catalyst comprising:

a) reacting an aluminoxane and a Lewis base in an optionally halogenated hydrocarbon solvent to form a particulate suspension;

b) reacting said suspension with a metallocene complex in an optionally halogenated hydrocarbon solvent; and optionally c) isolating the resulting olefin polymerisation catalyst.

Viewed from another aspect the invention provides a catalyst obtainable by, e.g. obtained by, a process as hereinbefore described.

Viewed from another aspect the invention provides the use of a catalyst as hereinbefore described in olefin polymerisation. Alternatively, the invention provides the use of the reaction product of an aluminoxane and a Lewis base to form a catalyst carrying suspension in an optionally halogenated hydrocarbon solvent.

Viewed from a still yet further aspect the invention provides a process for the preparation of polyolefins comprising polymerising at least one olefin in the presence of an olefin polymerisation catalyst as hereinbefore described.

The aluminoxane employed in the manufacture of the particle suspension can be any conventional aluminoxane as is known in the art.

Aluminoxanes are compounds with alternating aluminium and oxygen atoms generally compounds of formula I or II

  (I)

  (II)

where each R, which may be the same or different, is a $C_{1-10}$ alkyl group, and p is an integer having a value between 0 and 40). These compounds may be prepared by reaction of an aluminium alkyl with water. The production and use of aluminoxanes is described in the patent literature, especially the patent applications of Texas Alkyls, Albemarle, Ethyl, Phillips, Akzo Nobel, Exxon, Atomize Kosan, Witco, BASF and Mitsui.

Traditionally, the most widely used aluminoxane is methylalumoxane (MAO), an aluminoxane compound in which the R groups are methyls. Efforts have been made, however, to use aluminoxanes other than MAO. Thus, for example WO98/32775 (Borealis) proposes the use of metallocene procatalysts with alumoxanes in which R is a $C_{2-10}$ alkyl group, eg hexaisobutylalumoxane (HIBAO). In the present invention, it is preferred if the aluminoxane is MAO.

The optionally halogenated hydrocarbon solvent to be used in the first stage of the process must be one in which the reaction product of the Lewis base and aluminoxane is insoluble or only slightly soluble. This ensures the formation of a suspension. Suitable hydrocarbons therefore include $C_{4-12}$-alkanes such as isobutane, pentane, hexane, heptane and octane, aryl hydrocarbons such as benzene, toluene and xylene and halogenated alkane/aryl hydrocarbons such as dichloromethane, dichloroethane, dichloropropane, chlorobenzene, dichlorobenzene and trichlorobenzene. Mixtures of any of these solvents may also be employed. Preferably the solvent is aromatic, e.g. xylene. A particularly preferred solvent is toluene.

Whilst the solvent used in stage (b) of the process of the invention may be different from that employed in the first stage and may therefore be selected from any of those listed above, it is preferable if the same solvent is employed.

The Lewis base to be reacted with the aluminoxane is preferably an organic Lewis base and must comprise at least one free lone pair of electrons. Preferably, the Lewis bases of use in the invention comprise aliphatic or aromatic amines, alcohols, thiols, aldehydes, ketones, carboxylic acids or ethers. These compounds may contain up to 20 carbon atoms, e.g. up to 10 carbon atoms. Particularly suitable Lewis bases include phenol, benzyl alcohol, aniline, benzylamine etc. In an especially preferred embodiment the Lewis base comprises at least two groups, either the same or different, comprising free lone pairs e.g. aliphatic or aromatic diamines or diols, triols, hydroxy ethers, etc or mixtures thereof. These compounds may contain up to 20 carbon atoms, e.g. up to 10 carbon atoms. Especially preferably therefore, the Lewis base is ethylene glycol, glycerol, triethanolamine, butanediol, bisphenol, 4,4'-isopropylidenediphenol, 3-hydroxypropylene oxide and 1,4-butanediol diglycidyl ether.

The ratio of Lewis base to metallocene can vary over a wide range but should be carefully controlled to ensure the formation of advantageous particles. Ideally, the ratio of aluminium in the aluminoxane to Lewis base is 1 to 100 mol/mol, preferably 5 to 40 mol/mol, especially 10 to 25 mol/mol. Higher ratios of aluminoxane to Lewis base may be employed especially when tri or higher "lone pair" functionalised Lewis bases are employed.

The solvent used for the Lewis base can be the same or different as for the aluminoxane solution. The choice and amount of the solvent for the Lewis base depends on its solubility. The desired concentration will be set by the temperature of the solution so that the Lewis base is preferably dissolved.

The reaction of Lewis base and aluminoxane may take place at atmospheric pressure. The reaction temperature and time can vary over a wide range depending on the Lewis base employed but are preferably between −10° C. to 80° C. and 1 to 48 hours, especially between 40 to 70° C., e.g. 55° C. and 10 hours to 25 hours, respectively.

By "metallocene" is here meant an η-ligand metal complex, e.g. an "open sandwich" or "half sandwich" compound in which the metal is complexed by a single η-ligand, a "sandwich" compound in which the metal is complexed by two or more η-ligands, a "handcuff" compound" in which the metal is complexed by a bridged bis-η-ligand or a "scorpionate" compound in which the metal is complexed by an η-ligand linked by a bridge to a σ-ligand.

Suitable metallocene complexes for inclusion in the catalyst of the invention include cyclopentadienyl, indenyl and fluorenyl species which are well known in the art. Examples of further η-ligands abound in the patent literature relating to metallocene and pseudo metallocene olefin polymerization (pro)catalysts, in particular that deriving from Exxon, Hoechst, Phillips, Dow, Chisso, Mitsui, Fina, BASF, Mitsubishi, Mobil, Targor, DSM and Borealis, eg WO96/23010, WO98/49208, WO99/12981, WO99/19335, WO97/28170, EP-A-423101, EP-A-537130, etc. as well as "Metallocenes" Vol. 1, Togni and Halterman (Eds.) Wiley-VCH, 1998.

Preferred metallocene complexes are bis(cyclopentadienyl) compounds wherein the cyclopentadienyl ring may comprise substituents such as siloxy groups or alkyl groups. A particularly preferred compound is bis(n-Bu-cyclopentadienyl) zirconium dichloride.

The metal of use in the metallocene is selected from groups 3 to 8 of the periodic table, especially groups 4, 5 and 6. Suitable metals therefore include titanium, zirconium, hafnium and vanadium. The metals are typically coordinated to the η-ligands and also to sigma ligands such amido, halo or hydrogen. Chloro sigma ligands are most preferred.

The amount of metallocene added to the suspension is linked to the amount of aluminoxane. The molar ratio between aluminium in the aluminoxane and the transition metal in metallocene can be in the range 1:1 to $10^8$:1. Typically however, the ratio is between 10:1 and $10^5$:1, preferably 20:1 to 1000:1, especially 50:1 to 100:1. Conveniently, the addition of the metallocene to the suspension formed in part (a) of the process of the invention occurs at the same temperature as the reaction of the aluminoxane and Lewis base. Process step (b) of the process of the invention may take from 1 to 5 hours, preferably 2 hours.

The size of the resulting catalyst particles varies, inter alia, depending on the reaction equipment, how the reaction is performed (e.g. reaction temperature, component addition speed etc), stirring during reactant addition and stirring during reaction. More vigorous stirring gives rise to smaller catalyst particles. Lower reaction temperatures and slower component addition speeds give larger particles. Stirring of the reaction mixture is conveniently carried out using an anchor stirrer which may rotate at 100 RPM to 300 RPM, e.g. 250 RPM.

The olefin to be polymerized by the olefin catalyst of the invention may be ethylene, propylene or a mixture of ethylene or propylene and another $C_{2-10}$ α-olefin, for example, ethene, propene, n-but-1-ene, n-hex-1-ene, 4-methyl-pent-1-ene, n-oct-1-ene etc. The olefins polymerized may also include any compound which includes unsaturated polymerizable groups. Thus for example unsaturated compounds, such as $C_{6-20}$ olefins (including cyclic and polycyclic olefins (e.g. norbornene)), and polyenes, especially $C_{6-20}$ dienes, may be included in a comonomer mixture with lower olefins, e.g. $C_{2-5}$ α-olefins. Diolefins (ie. dienes) are suitably used for introducing long chain branching into the resultant polymer. Examples of such dienes include α,ω linear dienes such as 1,5-hexadiene, 1,6-heptadiene, 1,8-nonadiene, 1,9-decadiene, etc. Preferably the olefin to be polymerised in ethene.

The catalysts of the invention may be used in solution, slurry or gas phase polymerisations and such polymerisations are well-known in the art. Slurry polymerisations are preferred and may be carried out in a loop reactor or continuous stirred tank reactor. For loop reactors, the reaction temperature will generally be in the range 60 to 110° C. (e.g. 85–110° C.), the reactor pressure will generally be in the range 5 to 80 bar (e.g. 50–65 bar), and the residence time will generally be in the range 0.3 to 5 hours (e.g. 0.5 to 2 hours). The diluent used will generally be an aliphatic hydrocarbon having a boiling point in the range −70 to +100° C. In a preferred embodiment, polymerization is effected under supercritical conditions. Under such conditions the diluent is preferably propane.

In gas phase reactors, the reaction temperature used will generally be in the range 60 to 115° C. (e.g. 70 to 110° C.), the reactor pressure will generally be in the range 10 to 25 bar, and the residence time will generally be 1 to 8 hours. The gas used will commonly be a non-reactive gas such as nitrogen together with monomer (e.g. ethylene).

Hydrogen may be used to control the molecular weight of polymer components as is known.

The polymers produced by the process of the invention may be utilised in a variety of fields such as in the manufacture of films, pipe, sheets, tubes, containers, etc. The polymers are therefore suitable for blow moulding, injection moulding, rotomoulding etc.

In a preferred embodiment, the catalyst of the invention is prepolymerised prior to being used in a main polymerisation stage. It is believed that a prepolymerisation stage may allow improvements in particle morphology. Prepolymerisation is effected as is known in the art by contacting the initially formed catalyst with a monomer or monomers and allowing a small amount of polymerisation to take place. Suitable monomers are ethylene, propylene etc however, in a preferred embodiment the olefin employed is one which gives rise to a polymer of higher melting point than that of the main polymerisation. Suitable monomers in this regard are 3-methylpentene and vinylcylohexane.

Viewed from a further aspect the invention provides a process for the preparation of a prepolymerised olefin polymerisation catalyst comprising:

a) reacting an aluminoxane and a Lewis base in an optionally halogenated hydrocarbon solvent to form a particulate suspension;

b) reacting said suspension with a metallocene complex in an optionally halogenated hydrocarbon solvent to form a catalyst;

c) prepolymerising said catalyst in the presence of an olefin; and optionally d) isolating the prepolymerised catalyst.

The invention is further described below with reference to the following non-limiting examples.

EXAMPLE 1

Comparative 20.4 ml of 30% MAO was mixed with 0.188 mg of bis(n-butylcyclopentadienyl)zirconium dichloride (Al/Zr=200) in 5.1 ml of toluene. The reaction was allowed to run for 2 hours at room temperature. 15.8 ml of this complex was added to 10.2 g of Sylopol 55SJ Silica and mixed for 2 h at room temperature. The product was dried under nitrogen at a maximum of 70° C.

EXAMPLE 2

Unsupported Catalyst (No Silica Carrier)

1.62 g of bisphenol-A in 130 ml of toluene was added slowly to 14.2 g of 30% MAO solution. The mixture was stirred for 20 h at 250 RPM and 55° C. during which time solid particles were formed. 0.144 g of bis(n-butylcyclopentadienyl)zirconium dichloride (Al/Zr=200) in 20 ml toluene was added to the reaction mixture and stirred for 2 h at 55° C. After drying 6.2 g of catalyst was collected.

EXAMPLE 3

Unsupported Catalyst Prepolymerised 1.62 g of bisphenol-A in 130 ml of toluene was added slowly to 14.2 g of 30% MAO solution. The mixture was stirred for 20 h at 55° C. during which time solid particles were formed. 0.144 g of bis(n-butylcyclopentadienyl)zirconium dichloride (Al/Zr=200) in 20 ml toluene was added to the reaction mixture and stirred for 2 g at 55° C. After drying 6.2 g of catalyst was collected. Prepolymerisation was carried out at room temperature by adding slowly 6 g of vinylcyclohexane into the catalyst/toluene suspension and mixing for one hour. After drying 10 g of prepolymerised catalyst was collected.

EXAMPLE 4

Polymerisation

Bench scale slurry polymerisations were carried out in a 2L reactor using Isobutane, 100 ml, ethylene monomer (7.5 bar) at a total pressure of 23.5 bar, run time 60 mins at 85° C.

| Cat. | Activity (kgPE/gcath) | Comments |
|---|---|---|
| Ex. 1 | 1.5 | Good Morphology, no fouling |
| Ex. 2 | 0.7 | No fouling, morphology acceptable with some bigger particles |
| Ex. 3 | 2.0 | Slight fouling, morphology, acceptable |

As is clear, when no conventional solid support is used, morphology is still acceptable.

The invention claimed is:

1. A process for the preparation of an unsupported olefin polymerisation catalyst comprising:
    a) reacting an aluminoxane and a Lewis base in an optionally halogenated hydrocarbon solvent to form a particulate suspension;
    b) reacting said suspension with a metallocene complex in an optionally halogenated hydrocarbon solvent; and
    c) isolating the unsupported olefin polymerisation catalyst; wherein said Lewis base comprises an aliphatic or aromatic amine, an ether, phenol, benzyl alcohol, ethylene glycol, glycerol, bisphenol, triethanolamine, butanediol, 4,4'-isopropylidenediphenol, 3-hydroxypropylene oxide, or a mixture thereof.

2. A process as claimed in claim 1, wherein said Lewis base comprises aniline, benzylamine, 1,4-butanediol diglycidyl ether, or a mixture thereof.

3. A process as claimed in claim 1, wherein said aluminoxane is methylalumoxane.

4. A process as claimed in claim 1, wherein the optionally halogenated hydrocarbon solvent used during step a) comprises an optionally halogenated $C_{4-12}$ alkane or $C_{6-12}$ arylene.

5. A process as claimed in claim 4, wherein said hydrocarbon solvent comprises toluene or xylene.

6. A process as claimed in claim 1, wherein the solvent employed in step b) is the same as that employed in step a).

7. A process as claimed in claim 1, wherein the ratio of aluminium in the aluminoxane to Lewis base is 5 to 40 mol/mol.

8. A process as claimed in claim 1, wherein the metallocene complex is bis(n-Bu-cyclopentadienyl) zirconium dichloride.

9. A process as claimed in claim 1, wherein the molar ratio between aluminium in the aluminoxane and the transition metal in metallocene is in the range 20:1 to 1000:1.

10. A process as claimed in claim 1, further comprising d) polymerising at least one olefin in the presence of the isolated unsupported olefin polymerisation catalyst of step c).

11. A process as claimed in claim 10, wherein said polymerisation takes place in the slurry phase.

12. A process for the preparation of polyolefins comprising polymerising at least one olefin in the presence of an isolated suspension of unsupported catalyst particles made by the process as claimed in claim 1.

13. A process for the preparation of a prepolymerised olefin polymerisation catalyst comprising:
  a) reacting an aluminoxane and a Lewis base in an optionally substituted hydrocarbon solvent to form a particulate suspension;
  b) reacting said suspension with a metallocene complex in an optionally substituted hydrocarbon solvent to form an unsupported catalyst;
  c) prepolymerising said catalyst in the presence of an olefin; and
  d) isolating the prepolymerised catalyst; wherein said Lewis base comprises an aliphatic or aromatic amine, an ether, phenol, benzyl alcohol, ethylene glycol, glycerol, bisphenol, triethanolamine, butanediol, 4,4'-isopropylidenediphenol, 3-hydroxypropylene oxides, or a mixture thereof.

* * * * *